March 8, 1966 L. O. KEYS 3,239,601

MULTIPLE SUBJECT TELEVISING APPARATUS
WITH OSCILLATING CAMERA MOUNT

Filed June 1, 1964 2 Sheets-Sheet 1

INVENTOR.
LYLE O. KEYS

BY Mallinckrodt and Mallinckrodt
ATTORNEYS

March 8, 1966 L. O. KEYS 3,239,601

MULTIPLE SUBJECT TELEVISING APPARATUS WITH OSCILLATING CAMERA MOUNT

Filed June 1, 1964 2 Sheets-Sheet 2

INVENTOR.
LYLE O. KEYS

BY Mallinckrodt and Mallinckrodt

ATTORNEYS

United States Patent Office 3,239,601
Patented Mar. 8, 1966

3,239,601

MULTIPLE SUBJECT TELEVISING APPARATUS WITH OSCILLATING CAMERA MOUNT

Lyle O. Keys, 2905 South 27 East, Salt Lake City, Utah

Filed June 1, 1964, Ser. No. 371,484
14 Claims. (Cl. 178—6)

Figures 1, 2:
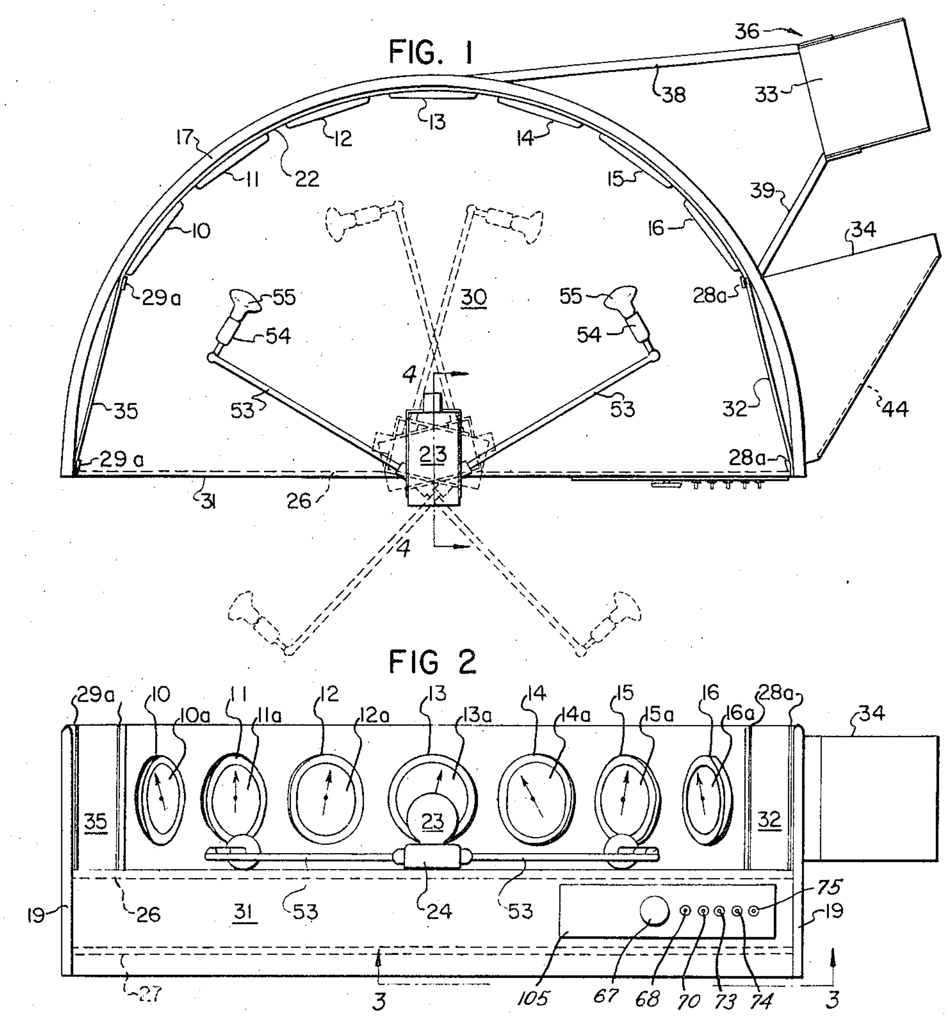

This invention relates to apparatus for successively televising individual items of a series of items arranged side-by-side; for example, the indicating faces of a series of meteorological or other instruments in the televising of weather information, time of day, industrial processing information, etc., whether broadcast through the air or over closed circuit distribution systems, such as coaxial cable systems used in small communities to relay picked-up television signals from broadcasting stations in larger cities.

Apparatus has been developed heretofore for reciprocating a television camera along and in front of a rectilinear array of meteorological instruments for televising visual representations of the indicating faces thereof in the dissemination of weather information by television. One item in the series of items so presented for televising has been a rear-projection screen onto which weather charts or other pictorial representations have been projected from the rear by an independently supported and operated slide projector. This apparatus is cumbersome, unduly expensive to construct, and inconvenient to operate. Moreover, it must be mounted upright and on the level to function properly.

In the making of the present invention, principal objects were to provide highly versatile and relatively inexpensive apparatus for the purpose, which will operate for long periods of time without trouble or the need for serving and repairs; to provide for various ways of mounting the apparatus, especially suspended from a wall or the ceiling so as to insure availability of a maximum amount of floor space for other purposes; to integrate a slide projector with the apparatus, as a working part thereof regardless of the manner of mounting the apparatus; to provide for automatically stopping the television camera precisely for screen viewing; and to provide for operation of the system with minimum consumption of electric power.

These objects have been accomplished by arranging the series of items in an arcuate array about an oscillating mount for the television camera as a radial center for the arc; by providing a rear-projection screen or the like as one (preferably terminal) item of the series and a card-holding aperture as another (preferably terminal) item of the series; by providing a rotary, adjustable mount for a slide projector as part of the structural framework of the apparatus, and a reflector box in conjunction with the screen for indirect projection of slides; by providing a system of controls, integrated with an electric motor for oscillating the camera, that automatically stops the camera at screen position, and special circuitry for operating the projector automatically; by mounting flood lights on extension arms rigid with and laterally of the camera and sufficiently far therefrom that the reflections from the cover glass surfaces of the indicating faces of the instruments will be outside the field of view of the camera; and by utilizing a special mechanical drive arrangement for the oscillating camera mount that can be operated by a fractional horsepower electric motor, e.g. one-eighth horsepower.

There is shown in the accompanying drawings a specific embodiment of the invention representing what is presently regarded as the best mode of carrying out the generic concepts in commercial practice. From the detailed description of this presently preferred form of the invention, other more specific objects and features will become apparent.

Figure 3:
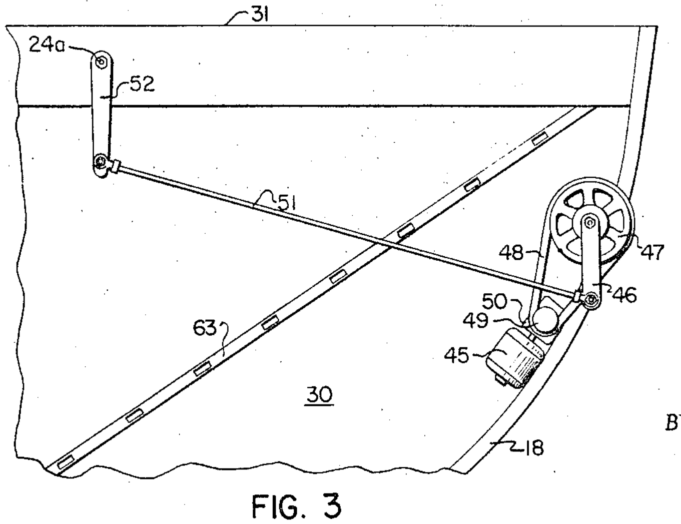
Figure 4:
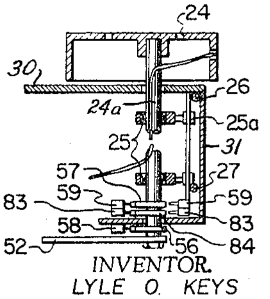
Figure 7:
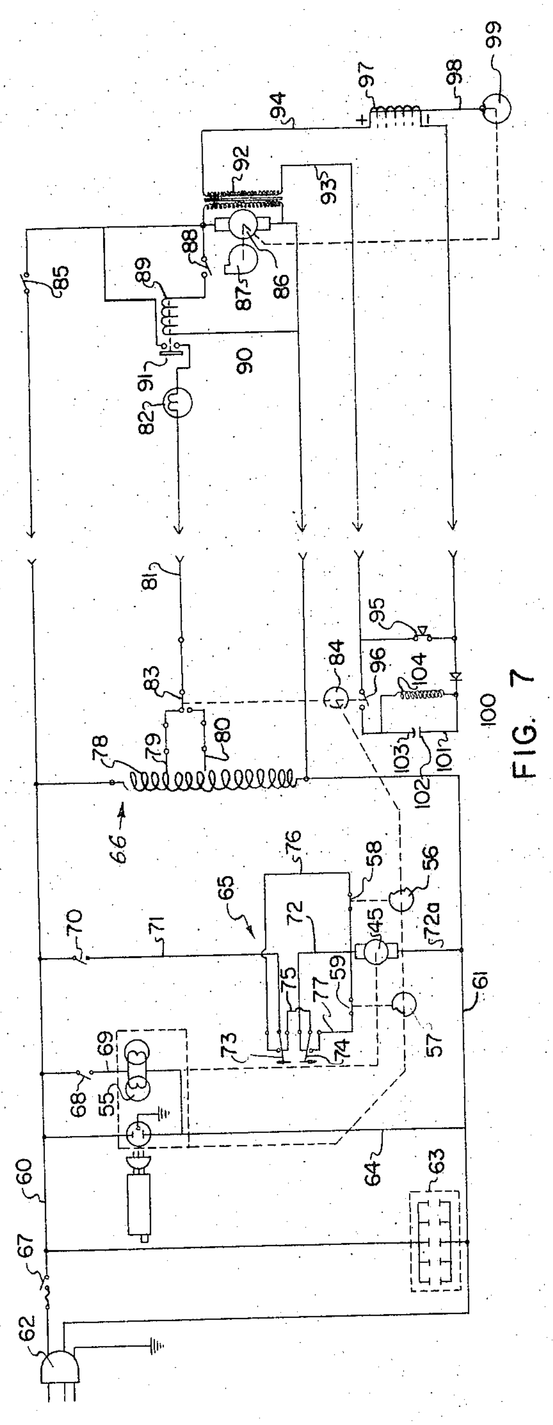
Figure 6:
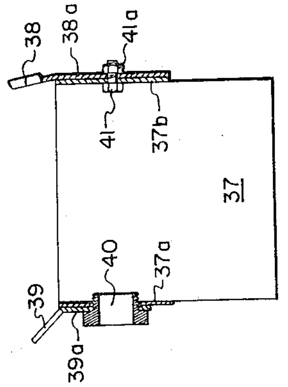
Figure 5:
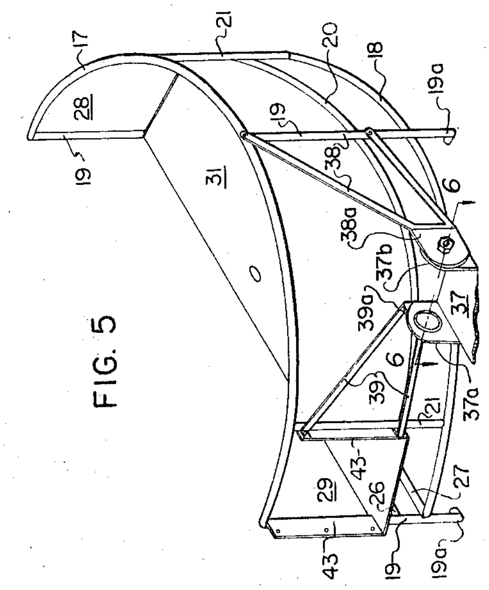

In the drawings:

FIG. 1 represents a top plan view of the apparatus, with terminal positions of the television camera and floodlights and interior structure of the reflector box for slide picture transmission indicated by broken lines;

FIG. 2, a front elevation;

FIG. 3, a fragmentary bottom plan drawn to a considerably larger scale as taken from the line 3—3, FIG. 2;

FIG. 4, a fragmentary vertical section taken on the line 4—4, FIG. 1, omitting the camera;

FIG. 5, a perspective view of the arcuate, mounting framework, looking from above and the rear and particularly showing the rotary, adjustable mounting of the slide projector mount on the framework;

FIG. 6, a fragmentary horizontal section taken on the line 6—6 of FIG. 5 and drawn to a larger scale; and FIG. 7, a wiring diagram for the preferred form of apparatus illustrated.

Referring to the drawings:

In the illustrated embodiment, supporting structure for an arcuate series of seven different, side-by-side aligned, instruments, including a clock 10 and a series of meteorological instruments designated 11–16 respectively, is provided by an arcuately-formed structural framework, shown best in FIG. 5 as made up of elongate arcuate members 17 and 18 interconnected by members 19 having respective mounting leg portions 19*a*. An intermediate, elongate, arcuate member 20 and intermediate members 21 are provided for structural strength and as mounting and framing members for terminal items of the arcuate series of items to be televised. An appropriately apertured facing strip 22, FIGS. 1 and 2, provides direct mounting support for the several instruments 10–16, so that their glass-covered, indicating faces 10*a*–16*a* are within the oscillatory sweep of a television camera 23, which is supported on an oscillatory pedestal mount 24 whose spindle 24*a*, FIGS. 3 and 4, is journaled in bearings 25, mounted on an anchor plate 25*a*, which, in turn, is fixed to chord bars 26 and 27 of the structural framework. Window apertures 28 and 29 are provided at respective terminal end portions of the framework, also within the sweep of camera 23 for purposes hereinafter explained.

A floor panel 30 and front panel 31 conceal drive mechanism and electrical circuitry for operating the apparatus.

In the form illustrated, a rear projection screen 32 for presenting views from a slide projector 33 by way of a reflector box 34 is removably mounted in window aperture 28, as by slideway strips 28*a*, and provides one terminal item of the arcuate series, while a display card 35, carrying a printed message or other matter is similarly removably mounted, as by slideway strips 29*a*, in window aperture 29 and provides the other terminal items of such series.

It is a feature of the invention that the apparatus can be mounted in any convenient position, e.g. on a table or suspended from a wall or the ceiling, and need not be upright. To this end, a rotatable platform mount 36, FIGS. 1 and 5, is provided for the slide projector 33, so it can be maintained level and upright regardless of whether the apparatus as a whole is suspended sideways or upside down, for example.

As shown in FIGS. 5 and 6, the mount 36 comprises a platform member 37, having mounting ears 37*a* and 37*b* with axially aligned circular openings for alignment with corresponding openings in corresponding ears 38*a* and 39*a* of brackets 38 and 39, respectively, and for rotatably receiving an externally threaded tubular pipe fitting 40 and bolt 41, which adjustably secure such platform member 37 between such brackets for rotation from one position to another and for immobilization at a proper adjusted position by the tightening of adjustment nut 41*a*. The projection beam from the lens assembly of a projector 33 is directed through the hollow interior of fitting 40.

Reflector box 34, FIGS. 1 and 2, is secured to the structural framework behind projection screen aperture 28 thereof, and includes a front-surfaced, i.e. first-surfaced, mirror 44, which serves to reflect the projected image onto the back of the rear-projection screen 32.

It should be noted that both the projector mount 36 and the reflector box 34 are an integrated part of unitary apparatus, which is portable in the sense that it can be carried from place to place for installation as a unit.

The display card 35 is removably held in place over window aperture 29 by means of the lateral-retaining or slideway strips 29*a* so that it may be slidably extracted and replaced with different cards from time to time. When desired, the card may be removed and a newscaster or prepared scene in the background televised through the window aperture 29. Similarly, the screen 32 can be replaced with a message card if and when desired.

Camera mount 24 is oscillated by means of a fractional horsepower electric motor 45, FIG. 3, through a special pitman type of drive mechanism. Such mechanism comprises a rotary arm 46, which is rigidly attached to a pulley 47 connected by belt 48 to the power output pulley 49 of speed reducer 50. A pitman rod 51 connects arm 46 to a parallel arm 52 of slightly greater length, which is rigidly attached to spindle 24*a* of camera mount 24. Because arm 52 is of only slightly greater length than arm 46, the oscillatory motion of the camera mount is substantially of uniform speed throughout.

Arms 53 extend radially out from camera mount 24 to support lamp sockets 54 and flood lamps 55. In order to prevent mirrored reflection into the camera lens of such flood lamps or of the glare therefrom by reason of such lamps, they must be placed so that the light falls on the glass faces at an angle of incidence sufficiently great to make the equivalent angle of reflection place the reflected image or glare outside the field of view of the camera lens. It is preferred to extend the bracket arms 53 at an acute angle to the axis of the camera so as to reduce the distance between the flood lamps and the instruments, thereby increasing lighting efficiency.

In the illustrated instance, where the camera lens has a focal length of 25 millimeters and the distance from lens to televised area is approximately 32 inches, the bracket arms are placed at an angle of 60° to the axis of the camera and extend approximately 21 inches from the center of camera oscillation to the center of the lamp sockets 54, which sockets are mounted normal to the arms.

It is a feature of the invention that, at the option of the user, the camera can be made to stop, i.e. index, in the precise position necessary for televising a continuing run of views on screen 32 or a continuing newscast or performance through window aperture 29 and can be made to dwell in such position for the duration of the run of views, newscast, or performance.

To this end means are provided for controlling oscillation of the camera mount to the extent, at least, of establishing one or more predetermined positions of camera dwell along the arcuate series array of television subject areas as here specifically represented by the intermediate items 10–16 and the terminal items 32 and 35.

In the form illustrated, such means includes cams 56 and 57, shown in FIG. 4 and schematically in FIG. 7, mounted on the spindle 24*a* of camera mount 24 for actuating respective switches 58 and 59 of electric circuitry supplying power to such motor.

The circuitry comprises hot and return lines 60 and 61, respectively, leading from a plug 62 adapted for plug-in connection with any usual source of electric power. Across these lines is connected a plug strip 63 into which any of the several instruments 10–16 requiring electric power for normal operation are plugged. Also across these lines are connected camera power supply line 64, a drive motor power supply circuit shown generally at 65, including a special circuit for automatically stopping the drive motor, and a projector control circuit shown generally at 66, all as indicated in FIG. 7.

A manually actuated line control switch 67 in line 60 controls current flow through line 60 and serves as a main switch to control operation of the entire unit. A separate manually closed switch 68 positioned in line 69, interconnecting lines 60 and 64, controls current flow to flood lights 55 and the panel lights of instruments 10–16.

Another manually closed switch 70 controls current flow through lines 71 and 72*a* to motor 45. When switch 70 is closed and manually operated switches 73 and 74 are in their illustrated positions, a circuit is completed through lines 71, 75, 72, and 72*a* to drive the motor, which, in turn, drives camera mount 24 as previously described.

When it is desired that the camera index on window aperture 29, switch 73 is moved to its other contact position, thereby breaking the circuit between lines 71 and 75 and establishing a circuit through lines 71, 76, and 72*a*. This continues operation of motor 45 and rotation of spindle 24*a* until the camera has moved into position where it is aimed at aperture 29. At this time, cam 56 allows switch 58 to open, thereby breaking the motor circuit and preventing further camera sweep. When it is desired to again start camera sweep, switch 73 is moved to the illustrated position. Similarly, movement of switch 74 to its other position will complete a circuit through lines 71, 75, 77, and 72*a* to continue motor operation until cam 57, carried by spindle 24*a*, allows switch 59 to open and break the circuit. At this time, the camera will be directed toward aperture 28. The motor will be energized to continue camera scanning operations as soon as switch 74 is returned to the illustrated position.

The projector control circuit 66 includes a variable voltage transformer 78 having a fixed tap 79 and a variable tap 80 that is selectively connected to line 81 containing the projector lamp 82. Line 81 will normally be connected to tap 79 through switch 83, and approximately twenty volts will be applied to lamp 82 to keep it heated. When the camera approaches its position focusing on aperture 28, another cam 84, carried by the spindle 24*a*, allows switch 83 to move into contact with tap 80. The voltage applied to projection lamp 82 is then increased by an amount dependent upon the position of tap 80 with respect to transformer 78, to bring the lamp up to desired brilliance.

A manual switch 85 in line 60 controls the overall operation of the projector control circuit, and when it is closed the projector motor 86 is energized. The motor drives fan 87, which, in turn, blows on vane switch 88 to hold it closed. Closing of switch 88 completes the circuit from line 60 through switch 88, relay coil 89, and line 90 to energize the relay and close switch 91, thereby completing the circuit for energizing the projector lamp.

Closing of switch 85 also energizes transformer 92 and results in current flow through lines 93 and 94 when either switch 95 or switch 96 is closed. Switch 95 is manually operated, and, as long as it is closed, coil 97 will be energized to hold detent 98 away from the cam 99 of the usual projector slide change mechanism and the slides will continuously change in customary manner with the slide change mechanism being driven by motor 86.

During the normal scanning operation of the camera, however, it is desirable to have a different slide positioned for projection each time the camera focuses on aperture 28 and to have the slides change when the camera is focused elsewhere. This is accomplished by having switch 96 closed by cam 84 at a time when the camera is focused at a point other than aperture 28. This completes the circuit through line 94, rectifier 100, line 101, capacitor 102, and line 103 to energize coil 97 and allow the cam 99 of the projector slide change mechanism to move and the slides to change. Capacitor 102 allows coil 97 to operate one time only when switch 96 is closed, regardless of the length of time it is maintained closed. Resistor 104, connected in parallel with capacitor 102, discharges the capacitor when switch 96 is opened and this restores the circuit to its starting condition.

Control switches 67, 68, 70, 73, 74, and 95 are desirably mounted for easy access on front control panel 105, FIG. 2, and it is apparent that switches 73 and 74 can readily be regulated by a conventional programmer to position the switches periodically, thus giving a predetermined indexing period for the camera on either or both of the apertures 28 and 29. It is also apparent that cams 56 and 57 can be shaped as desired to obtain indexing at any desired point in the sweep of the camera.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

I claim:

1. Televising apparatus, comprising structure presenting an arcuate, series array of television subject areas; an oscillating mount for a televsion camera, said mount being disposed with its center of oscillation coincident with the radial center of said arcuate array so said areas will be within the oscillating sweep of said camera for visual broadcasting; means for oscillating the camera mount to sweep the array; and control means controlling oscillation of the camera mount and including means for establishing a predetermined position of camera dwell at selected ones of the subject areas.

2. The apparatus of claim 1, wherein the means for oscillating the camera mount comprises an electric motor and a mechanical drive between motor and mount; and wherein the means for controlling camera mount oscillation comprises electric circuitry provided with at least one automatic switch circuit for maintaining for a predetermined period of time indexing of said camera on a particular subject area, said circuit including a switch controlling current supply to the motor, and cam means operated by rotation of the camera mount for operating the switch.

3. The apparatus of claim 1, wherein a rear-projection screen forms one of the subject areas of the arcuate array; and such apparatus additionally comprises a projector mount operatively arranged behind said screen so that matter can be projected thereonto, the means for controlling oscillation of the camera mount including means for establishing a predetermined position of camera dwell at said screen.

4. The apparatus of claim 3, constructed as an integrated, portable entity and including rotary, adjustable means attaching the projector mount to the remainder of the structure for rotation about the projection axis of the projector as a center.

5. The apparatus of claim 3, additionally comprising a reflection box between projector mount and screen for transmitting projected views from the projector onto said screen.

6. Apparatus for televising information, comprising a series of instruments having reflective indicating faces; unitary structure mounting said instruments with their indicating faces aligned side-by-side as an arcuate array; an oscillating mount for a television camera, said mount forming part of the unitary structure and disposed with its center of oscillation coincident with the radial center of said arcuate array, so the indicating faces of said instruments will be within the oscillating sweep of said camera for televising; means for oscillating the camera mount to sweep the array; and floodlighting means for the array, said floodlighting means comprising floodlight-mounting bracket arms connected with the camera mount for oscillation therewith and projecting toward the arcuate array laterally of said mount at acute angles, respectively, to the camera viewing axis, and floodlamp sockets carried by said bracket arms, so that the angular relationship between the axes of the sockets and bracket arms and the said viewing axis maintains glare and floodlamp reflections outside the field of view of the camera lens during operation.

7. The apparatus of claim 6, additionally comprising a window aperture forming part of the arcuate array; and means for controlling oscillation of the camera mount, said means including means for establishing a predetermined position of camera dwell at said aperture.

8. The apparatus of claim 7, additionally comprising means for holding a display card at the aperture.

9. Apparatus for televising information, comprising a series of instruments having reflective indicating faces; unitary structure mounting said instruments with their indicating faces aligned side-by-side as an arcuate array; an oscillating mount for a television camera, said mount forming part of the unitary structure and disposed with its center of oscillation coincident with the radial center of said arcuate array, so the indicating faces of said instruments will be within the oscillating sweep of said camera for televising; means for oscillating the camera mount to sweep the array; floodlighting means for the array, said floodlighting means being rigidly associated with the camera mount for oscillation therewith; a rear-projection screen forming part of the arcuate array; a projector mount as part of the unitary structure and operatively arranged behind said screen so that matter can be projected onto the back thereof; and means controlling oscillation of the camera mount, said means including means for establishing a predetermined position of camera dwell at said screen.

10. The apparatus of claim 9, additionally comprising means attaching the projector mount to the remainder of the unitary structure for rotation about the projection axis of the projector as a center.

11. The apparatus of claim 9, additionally comprising a slide projector having a projection lamp therein, the projector being mounted on the projector mount; means for normally maintaining said projection lamp at a reduced brilliance; and means responsive to movement of the camera to its predetermined position of camera dwell to brighten said projection lamp to its desired projection brilliance.

12. The apparatus of claim 11, wherein the slide projector is equipped with an automatic slide changer and additionally comprising means adapted to change slides at the rate of one each time the camera is moved away from its predetermined position of dwell.

13. Televising apparatus, comprising structure presenting a series array of television subject areas, one of said areas being formed by a rear projection screen; a television camera; means mounting said camera for sweeping over said subject areas to sequentially visually broadcast them; means to drive said camera in its sweeping motion; control means controlling movement of said camera and including means for establishing a predetermined camera dwell at least at the subject area formed by the rear projection screen; a projector having a projection lamp; means mounting said projector behind said rear projection screen whereby matter can be projected onto the screen; means for normally maintaining the projection lamp at a reduced brilliance; and means responsive to movement of the camera to its position of dwell at the subject area formed by the rear projection screen for brightening said projection lamp to a desired projection brilliance.

14. The apparatus of claim 13, wherein the projector is a slide projector equipped with an automatic slide changer and including means responsive to camera position to actuate the slide changer of the projector to change slides being projected.

References Cited by the Examiner

UNITED STATES PATENTS

| | | | |
|---|---|---|---|
| 1,660,886 | 2/1928 | Randall | 178—6 |
| 2,188,145 | 1/1940 | Frantz. | |
| 2,393,638 | 1/1946 | Keinath et al. | 178—6 |
| 2,567,189 | 9/1951 | Davis. | |
| 2,713,609 | 7/1955 | Niklason | 178—6 |
| 2,822,720 | 2/1958 | Douglas | 88—16 |
| 3,164,838 | 1/1965 | Heinrich | 178—7.9 |

OTHER REFERENCES

Closed-Circuit Television Systems, RCA Service Company, 1958, Book I, Monochrome Systems, paragraph 5–27, page 182, and paragraphs 5–100 to 5–105, page 207.

T.V. Educator System, Pamphlet-Video Engineering Co., Inc., 1963, 20 pp. Ind. publications.

DAVID G. REDINBAUGH, *Primary Examiner.*

R. RICHARDSON, *Assistant Examiner.*